US012638385B2

(12) United States Patent
Mada et al.

(10) Patent No.: US 12,638,385 B2
(45) Date of Patent: May 26, 2026

(54) LIGHT DETECTION DEVICE

(71) Applicant: SONY GROUP CORPORATION, Tokyo (JP)

(72) Inventors: Yusuke Mada, Tokyo (JP); Atsushi Ito, Tokyo (JP); Masaki Orihashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 238 days.

(21) Appl. No.: 18/554,570

(22) PCT Filed: Jan. 28, 2022

(86) PCT No.: PCT/JP2022/003255
§ 371 (c)(1),
(2) Date: Oct. 9, 2023

(87) PCT Pub. No.: WO2022/224525
PCT Pub. Date: Oct. 27, 2022

(65) Prior Publication Data
US 2024/0201081 A1 Jun. 20, 2024

(30) Foreign Application Priority Data
Apr. 23, 2021 (JP) ................................ 2021-073280

(51) Int. Cl.
*G01N 21/35* (2014.01)
*F25B 21/02* (2006.01)
*G01N 21/3563* (2014.01)

(52) U.S. Cl.
CPC ......... *G01N 21/3563* (2013.01); *F25B 21/02* (2013.01); *G01N 2201/0231* (2013.01)

(58) Field of Classification Search
CPC ........ G01N 21/3563; G01N 2201/0231; F25B 21/02
See application file for complete search history.

(56) References Cited

U.S. PATENT DOCUMENTS 5,834,661 A * 11/1998 Nonaka .................. G01N 25/72
73/866
7,679,203 B2 * 3/2010 Bharathan .............. H10N 10/17
257/E27.008
(Continued)

FOREIGN PATENT DOCUMENTS

JP 10-033512 A 2/1998
JP 2003-163409 A 6/2003
(Continued)

OTHER PUBLICATIONS

International Search Report and Written Opinion of PCT Application No. PCT/JP2022/003255, issued on Apr. 5, 2022, 10 pages of ISRWO.

*Primary Examiner* — Hugh Maupin
(74) *Attorney, Agent, or Firm* — CHIP LAW GROUP

(57) ABSTRACT

Provided is a light detection device including a Peltier element that includes a P-type semiconductor and an N-type semiconductor disposed between a first substrate and a second substrate, and a light receiving part that receives light from the object having been subjected to temperature modulation by the Peltier element, in which the first substrate is provided on the object side, the second substrate is provided on the light receiving part side, and at least parts of the first substrate and the second substrate transmits light from the object. The present technology can be applied to, for example, a detection device that detects a predetermined material by receiving and analyzing light from an object to be measured.

16 Claims, 14 Drawing Sheets

(56)     References Cited

U.S. PATENT DOCUMENTS

| | | | | |
|---|---|---|---|---|
| 9,976,910 | B2 * | 5/2018 | Yagami | H04N 23/23 |
| 2004/0019431 | A1 * | 1/2004 | Sterling | A61B 5/1455 |
| | | | | 702/19 |
| 2005/0045702 | A1 * | 3/2005 | Freeman | B23K 31/02 |
| | | | | 228/180.21 |
| 2005/0197790 | A1 * | 9/2005 | Sterling | A61B 5/14532 |
| | | | | 702/22 |
| 2008/0168775 | A1 * | 7/2008 | Windheim | H10N 10/13 |
| | | | | 136/200 |
| 2019/0072431 | A1 * | 3/2019 | Hirose | H10F 77/407 |
| 2022/0320405 | A1 * | 10/2022 | Park | H10N 10/13 |

FOREIGN PATENT DOCUMENTS

| | | | |
|---|---|---|---|
| JP | 2004-535213 | A | 11/2004 |
| JP | 2005-512644 | A | 5/2005 |
| JP | 2008-170305 | A | 7/2008 |
| JP | 2013-538541 | A | 10/2013 |
| WO | 2003/045235 | A1 | 6/2003 |

* cited by examiner

LIGHT DETECTION DEVICE

CROSS REFERENCE TO RELATED APPLICATIONS

This application is a U.S. National Phase of International Patent Application No. PCT/JP2022/003255 filed on Jan. 28, 2022, which claims priority benefit of Japanese Patent Application No. JP 2021-073280 filed in the Japan Patent Office on Apr. 23, 2021. Each of the above-referenced applications is hereby incorporated herein by reference in its entirety.

TECHNICAL FIELD

The present technology relates to a light detection device, and for example, to a light detection device configured to detect radiant light from an object to be measured.

BACKGROUND ART

Infrared light having a wavelength of 8 µm to 10 µm may be referred to as a molecular fingerprint region because light absorption due to vibration of molecules including carbon molecules is observed. It has been proposed to analyze organic substances by spectrally diffracting and analyzing light in this wavelength region which has passed through a material to be measured (see, for example, PTL 1).

PTL 1 proposes obtaining composition information of an object to be measured by observing changes in wavelength while applying temperature modulation to the object to create a temperature gradient.

CITATION LIST

Patent Literature

[PTL 1]
WO 2003/045235

SUMMARY

Technical Problem

It is desirable to be able to efficiently apply temperature modulation to an object to be measured, to be able to receive more radiant light from the object to be measured, and to be able to obtain desired information with higher accuracy.

The present technology has been devised in view of such circumstances, and makes it possible to efficiently perform temperature modulation on an object to be measured and to receive more radiant light from the object to be measured.

Solution to Problem

A light detection device according to one aspect of the present technology includes a Peltier element configured of a P-type semiconductor and an N-type semiconductor disposed between a first substrate and a second substrate, and a light receiving part configured to receive light from an object having been subjected to temperature modulation by the Peltier element, in which the first substrate is provided on the object side, the second substrate is provided on the light receiving part side, and at least parts of the first substrate and the second substrate are configured to transmit light from the object.

A light detection device according to one aspect of the present technology includes a Peltier element configured of a P-type semiconductor and an N-type semiconductor disposed between a first substrate and a second substrate, and a light receiving part configured to receive light from an object having been subjected to temperature modulation by the Peltier element. The first substrate is provided on the object side, the second substrate is provided on the light receiving part side, and at least parts of the first substrate and the second substrate are configured to transmit light from the object.

The light detection device may be an independent device or may be an internal block constituting a single device.

DESCRIPTION OF EMBODIMENTS

Hereinafter, modes for carrying out the present technology (hereinafter referred to as "embodiments") will be described.

<Configuration of Light Detection Device>

Figure 1:
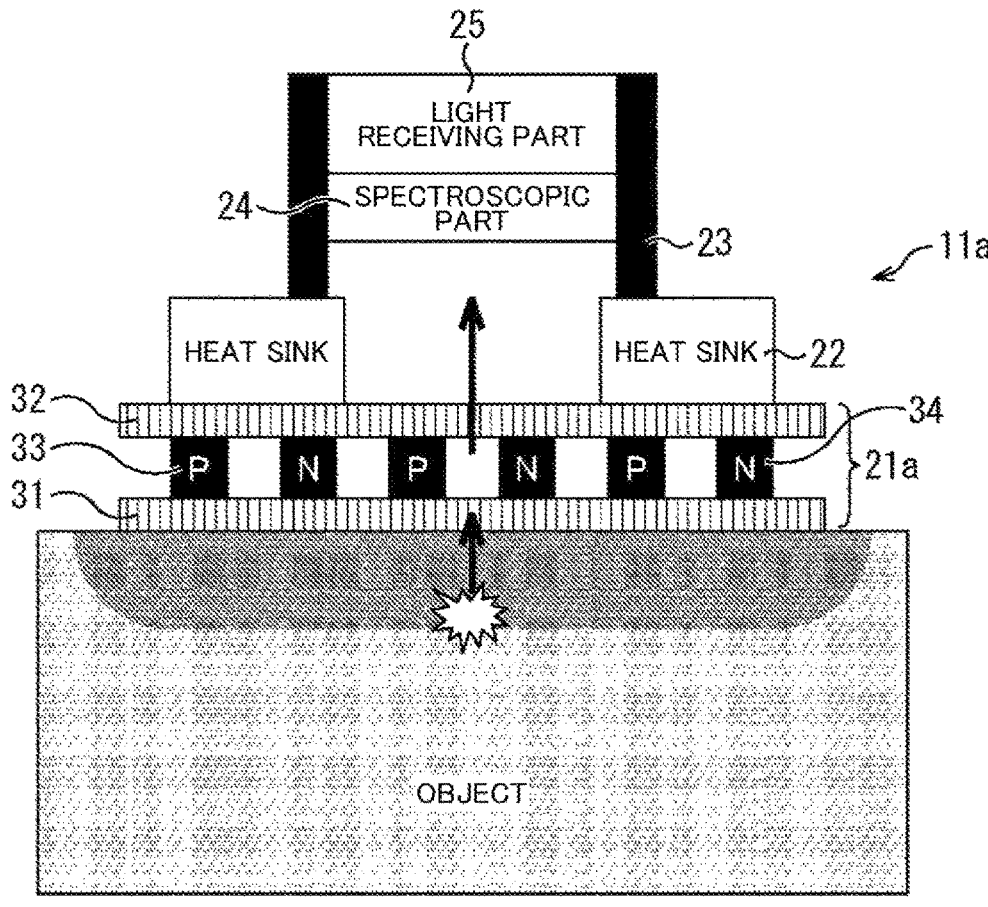
FIG. 1 is a diagram illustrating a configuration of an embodiment of a light detection device to which the present technology is applied.

FIG. 1 is a diagram illustrating a configuration of an embodiment of a light detection device to which the present technology is applied. In a first embodiment illustrated in FIG. 1, a light detection device 11a is configured to include a Peltier element 21a, a heat sink 22, a case 23, a spectroscopic part 24, and a light receiving part 25. The Peltier element 21a includes a substrate 31, a substrate 32, a P-type semiconductor 33, and an N-type semiconductor 34.

The heat sink 22 is disposed on the substrate 32 of the Peltier element 21a, and the case 23 is disposed on the heat sink 22. The spectroscopic part 24 and the light receiving part 25 are disposed in the case 23.

The Peltier element 21a has a structure in which the substrate 31 and the substrate 32 are laminated above and below a thermoelectric conversion element in which the P-type semiconductor 33 and the N-type semiconductor 34 are electrically connected in a row. Here, a case where the substrate 31 and the substrate 32 are directly laminated above and below the P-type semiconductor 33 and the N-type semiconductor 34 will be described as an example. However, a configuration in which an electrode connecting the P-type semiconductor 33 and the N-type semiconductor 34 is provided, and the substrate 31 and the substrate 32 are laminated on the electrode may also be adopted.

Figure 2:
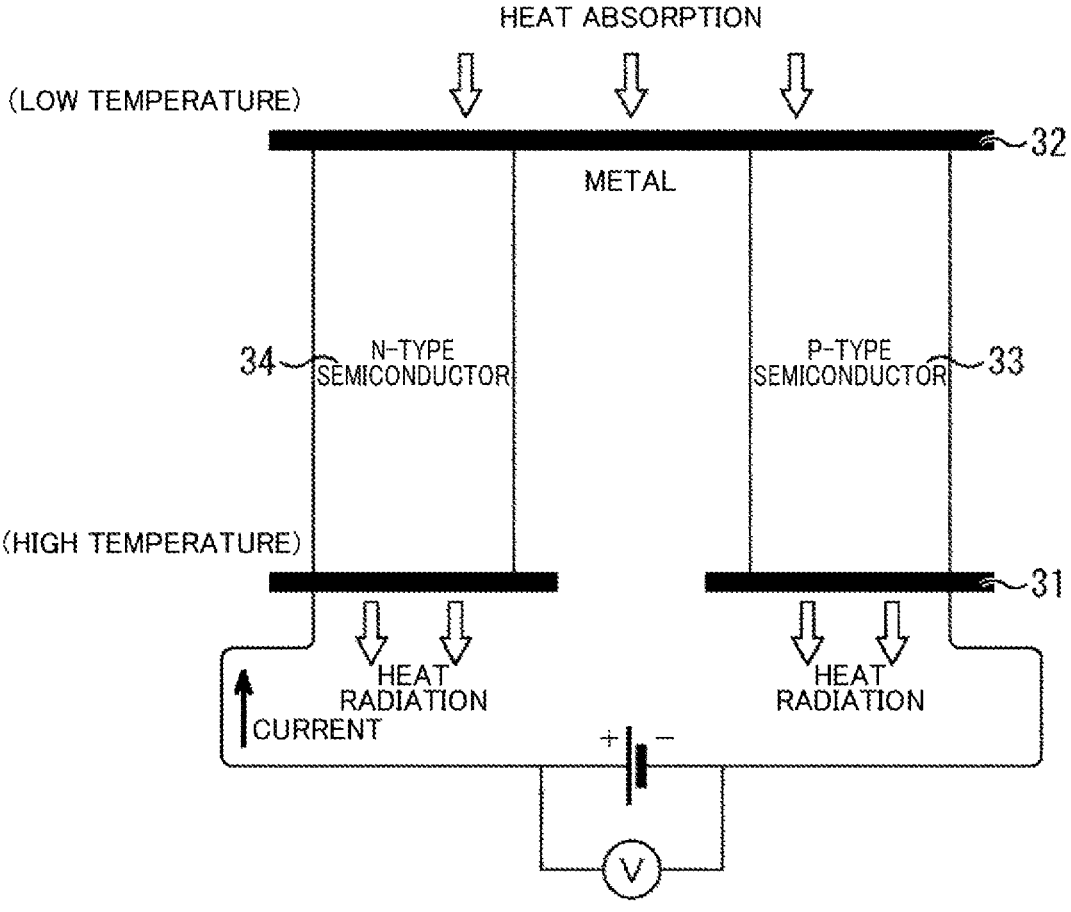
FIG. 2 is a diagram illustrating a Peltier element.

As illustrated in FIG. 2, the Peltier element 21a causes a current to flow from the N-type semiconductor 34 to the P-type semiconductor 33 so that the lower substrate 31 radiates heat and the upper substrate 32 absorbs heat. When the direction of a current flow is reversed, the lower substrate 31 absorbs heat and the upper substrate 32 radiates heat.

The light detection device 11a illustrated in FIG. 1 is a device that detects a predetermined material contained in an object by measuring radiant light from the object. Description of processing for detecting a predetermined object by the light detection device 11a will be added.

Infrared light having a wavelength of 8 μm to 10 μm (hereinafter referred to as mid-infrared light) may be referred to as a molecular fingerprint region because light absorption due to vibration of molecules including carbon molecules is observed. By utilizing this, the light detection device 11a analyzing organic substances can be created by spectrally diffracting and analyzing light in a wavelength region which has passed through a material to be measured.

A wavelength band of mid-infrared light overlaps a wavelength band of radiant light emitted from a material at room temperature or body temperature. For this reason, when radiant light can be used, the light detection device 11a can easily analyze a composition of organic substances without needing a light source.

Since all spectra from materials in a thermal equilibrium state correspond to black body radiation, it is difficult to observe a material-specific spectrum only by spectrally diffracting radiant light. Consequently, the light detection device 11a includes the Peltier element 21a and has a structure in which temperature modulation can be applied to an object (object to be measured) by the Peltier element 21a. The light detection device 11a is configured to obtain composition information of an object to be measured by observing changes in some wavelengths while applying temperature modulation to the object to create a temperature gradient.

The light detection device 11a applies heat to the object by radiating heat from the substrate 31 in contact with the object to raise the temperature of the object, and absorbs heat from the object by absorbing heat from the substrate 31 to lower the temperature of the object.

The light detection device 11a is configured to observe changes in some wavelengths by spectrally diffracting light from an object (object to be measured) by the spectroscopic part 24 and receiving the light by the light receiving part 25 while repeating heat radiation and heat absorption by changing the direction of a current flowing through the Peltier element 21a and applying temperature modulation to the object to create a temperature gradient. The light detection device 11a drives the Peltier element 21a to change the temperature of the object by approximately +5° C. at a cycle of 1 Hz, for example.

The light detection device 11a illustrated in FIG. 1 has the heat sink 22 disposed on the substrate 32 as a heat radiation member, and has a structure in which absorbed heat can be easily radiated.

Radiant light emitted from the object having been subjected to temperature modulation is supplied to the spectroscopic part 24 via the Peltier element 21. The spectroscopic part 24 includes, for example, a bandpass filter, a Fabry-Perot interferometer, a differential spectrometer, a Fourier transform infrared spectrophotometer, and the like, and is configured to spectrally diffract (extract) light in a predetermined band.

The radiant light having been spectrally diffracted by the spectroscopic part 24 is received by the light receiving part 25. A pyroelectric sensor, a thermopile, a bolometer, an MCT sensor, or the like can be used as the light receiving part 25. The light detection device 11a performs spectral analysis of the object in this manner.

In general, substrates of a ceramic such as alumina or alumina nitride are used for the substrates 31 and 32 of the Peltier element 21a. Since such a ceramic substrate is a material that does not easily transmit infrared light, when it is used as the substrate 31 or the substrate 32 of the Peltier element 21a, there is a possibility that infrared light, which is radiant light, will not be able to pass through the substrate 31 or the substrate 32 and be received by the light receiving part 25.

At least one of the substrates 31 and 32 of the light detection device 11a is formed of a material that sufficiently transmits infrared light. In other words, a substrate that absorbs little mid-infrared light is used as at least one of the substrates 31 and 32. The substrate 31 and/or the substrate 32 is formed of a material that transmits mid-infrared light. In the substrate 31 and/or the substrate 32, only a region falling within an observation visual field of the light receiving part 25 may be formed of a material that transmits mid-infrared light.

The substrate 31 and/or substrate 32 can be formed of a material that transmits mid-infrared light with a wavelength of 5 μm or more, for example. Examples of such materials include silicon, germanium, chalcogenide glass, diamond, and the like.

Since the light detection device 11a includes the Peltier element 21a capable of applying temperature modulation to an object, it is possible to apply sufficient temperature modulation to the object and make large changes in radiant light from the object. Since the light detection device 11a includes the substrate 31 and/or the substrate 32 formed of a material that transmits mid-infrared light, it is possible to prevent radiant light from an object from being blocked by the substrate of the Peltier element 21a and for the light receiving part 25 to receive sufficient radiant light. Thus, according to the light detection device 11a, a desired material can be detected.

Second Embodiment

Figure 3:
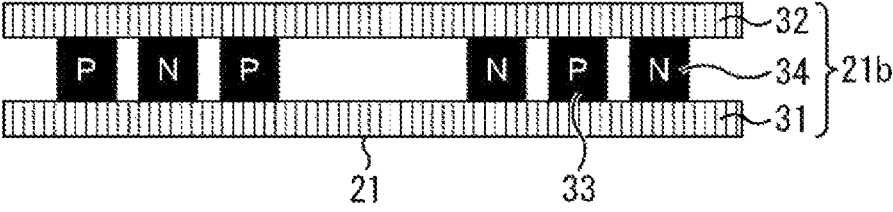
FIG. 3 is a diagram illustrating a configuration example of a Peltier element.

FIG. 3 is a diagram illustrating a configuration example of a Peltier element 21b included in a light detection device 11b according to a second embodiment. In the following description, the same parts as those of the light detection device 11a (the Peltier element 21a included in the light detection device 11a) in the first embodiment illustrated in FIG. 1 will be denoted by the same reference numerals, and description thereof will be omitted as appropriate.

The Peltier element 21b illustrated in FIG. 3 is different from the Peltier element 21a in the first embodiment in that a P-type semiconductor 33 and an N-type semiconductor 34 are not disposed in the central region thereof, and other points are the same. A region where the P-type semiconductor 33 and the N-type semiconductor 34 are not disposed corresponds to an observation visual field of a light receiving part 25. In other words, the P-type semiconductor 33 and the N-type semiconductor 34 are disposed to avoid an optical axis of the light receiving part 25.

By adopting a configuration in which the P-type semiconductor 33 and the N-type semiconductor 34 are not disposed in a region serving as the observation visual field of the light receiving part 25, it is possible to prevent the P-type semiconductor 33 and the N-type semiconductor 34 from inhibiting radiant light generated from an object and to further increase radiant light to be received by the light receiving part 25.

Third Embodiment

Figure 4:
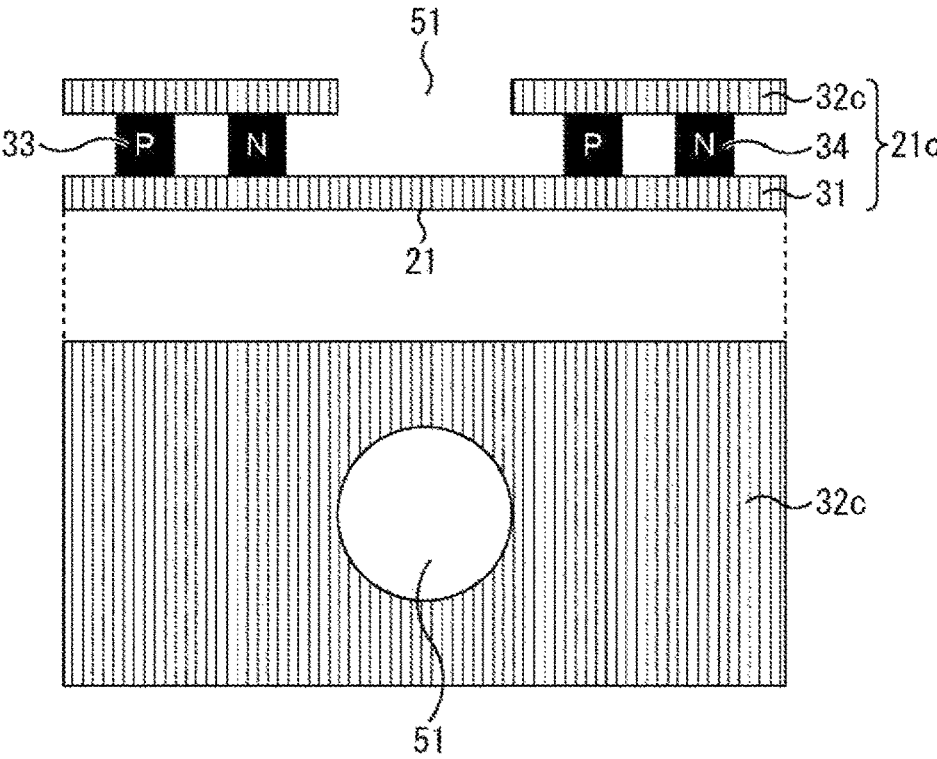
FIG. 4 is a diagram illustrating another configuration example of a Peltier element.

FIG. 4 is a diagram illustrating a configuration example of a Peltier element 21c included in a light detection device 11c according to a third embodiment. An upper drawing in FIG. 4 illustrates a configuration example of a cross-section of the Peltier element 21c, and a lower drawing in FIG. 4 is a plan view illustrating a configuration example of the Peltier element 21c when viewed from a substrate 32c side.

The Peltier element 21c in the third embodiment is different from the Peltier element 21b in the second embodiment in that a hole 51 is formed in the central portion of the substrate 32c, and is configured similarly in other respects.

In the Peltier element 21b in the second embodiment illustrated in FIG. 3, the region of the substrate 32c of the Peltier element 21c corresponding to a region where a P-type semiconductor 33 and an N-type semiconductor 34 are not disposed is the hole 51. That is, the Peltier element 21c illustrated in FIG. 4 is configured such that the P-type semiconductor 33 and the N-type semiconductor 34 are not disposed in a region serving as an observation visual field of a light receiving part 25, and the hole 51 is formed in the region of the substrate 32c corresponding to the region where the P-type semiconductor 33 and the N-type semiconductor 34 are not disposed.

The Peltier element 21c is configured such that the P-type semiconductor 33 and the N-type semiconductor 34 are not disposed in the region serving as the observation visual field of the light receiving part 25 and the hole 51 is provided in the substrate 32c, and thus the P-type semiconductor 33, the N-type semiconductor 34 and the substrate 32c can prevent radiant light generated from an object from being inhibited and to further increase radiant light to be received by the light receiving part 25.

The substrate 32c may be formed of a material with high thermal conductivity. The substrate 32c is formed of a material with high thermal conductivity, and thus it is possible to improve the efficiency of heat radiation from the substrate 32c. Since heat transmitted from the substrate 31 to the substrate 32c via the P-type semiconductor 33 and the N-type semiconductor 34 can be efficiently radiated from the substrate 32c, it is possible to increase a temperature amplitude during temperature modulation. A temperature amplitude during temperature modulation can be increased, and thus detection accuracy can be further improved.

When the substrate 32c is formed of a material with high thermal conductivity, for example, copper (Cu), silicon carbide (SiC), or the like can be used as the material. The substrate 32c includes the hole 51 and is not positioned in the region serving as the observation visual field of the light receiving part 25. Thus, even when the substrate 32c is formed of a material that does not transmit mid-infrared light, the reception of radiant light from an object is not inhibited, and satisfactory light reception can be maintained.

Fourth Embodiment

Figure 5:
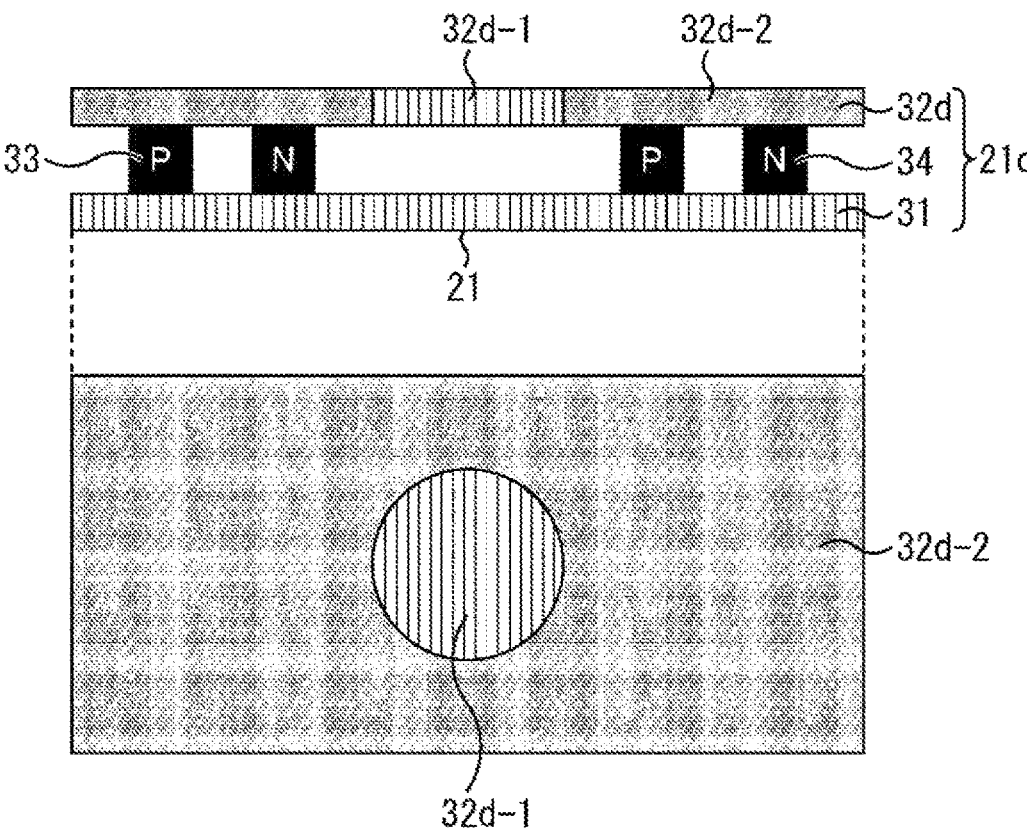
FIG. 5 is a diagram illustrating another configuration example of a Peltier element.

FIG. 5 is a diagram illustrating a configuration example of a Peltier element 21d included in a light detection device 11d according to a fourth embodiment. An upper drawing in FIG. 5 illustrates a configuration example of a cross-section of the Peltier element 21d, and a lower drawing in FIG. 5 is a plan view illustrating a configuration example of the Peltier element 21d when viewed from a substrate 32d side.

The Peltier element 21d in the fourth embodiment is different from the Peltier element 21a in the first embodiment in that the substrate 32d includes a substrate 32d-1 and a substrate 32d-2 formed of different materials, and is configured similarly in other respects.

A substrate 32g-1 in the central portion of the substrate 32d and a substrate 32g-2 other than the central portion are formed of materials having different transmittances for mid-infrared light. The substrate 32g-1 of the substrate 32d is formed of a material having a higher transmittance for mid-infrared light than the substrate 32g-2. That is, the substrate 32d is designed such that the inner portion corresponding to the substrate 32g-1 has a higher transmittance than an outer peripheral portion corresponding to the substrate 32g-2.

The substrate 32g-1 can be, for example, a region corresponding to the hole 51 of the Peltier element 21c illustrated in FIG. 4. That is, the region serving as the observation visual field of the light receiving part 25 may be formed of a material that transmits mid-infrared light, and the region other than the observation visual field may be formed of any material regardless of whether the material transmits mid-infrared light. For example, the substrate 32g-1 is formed of the same material as that of the substrate 31 and is configured using a material such as silicon, germanium, chalcogenide glass, or diamond.

The substrate 32g-2 can be formed of a material with high thermal conductivity in order to improve heat radiation performance. The substrate 32g-2 can be formed using a material such as copper (Cu) or silicon carbide (SiC).

In the Peltier element 21d in the fourth embodiment, it is also possible to prevent radiant light generated from an object from being inhibited and to further increase radiant light to be received by the light receiving part 25.

Fifth Embodiment

Figure 6:
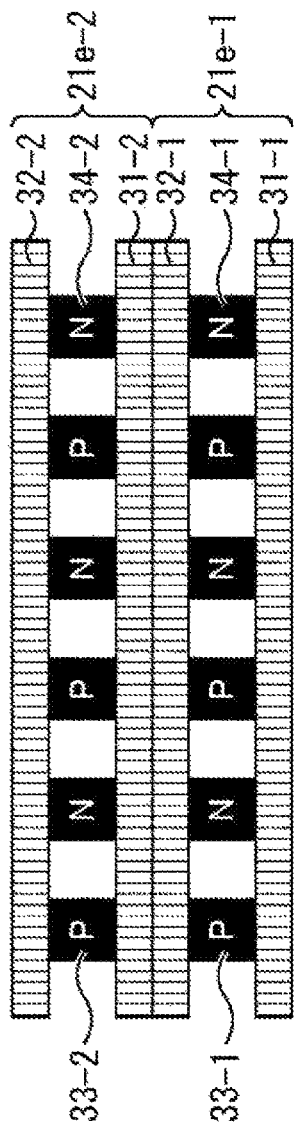
FIG. 6 is a diagram illustrating another configuration example of a Peltier element.

FIG. 6 is a diagram illustrating a configuration example of a Peltier element 21e included in a light detection device 11e according to a fifth embodiment.

The Peltier element 21e in the fifth embodiment is configured such that a Peltier element 21e-1 and a Peltier element 21e-2 are laminated. Each of the Peltier element 21e-1 and the Peltier element 21e-2 can have the same configuration as the Peltier element 21a (FIG. 1).

In the Peltier element 21e-1, a thermoelectric conversion element in which a P-type semiconductor 33-1 and an N-type semiconductor 34-1 are electrically connected in a row is formed between substrates 31-1 and 32-1. Similarly, in the Peltier element 21e-2, a thermoelectric conversion element in which a P-type semiconductor 33-2 and an N-type semiconductor 34-2 are electrically connected in a row is formed between substrates 31-2 and 32-2.

The Peltier elements 21e-1 and 21e-2 are laminated such that the substrate 31-2 of the Peltier element 21e-2 is positioned on the substrate 32-1 of the Peltier element 21e-1. Although the substrate 32-1 and the substrate 31-2 are described separately here for the sake of description, they may be formed as one substrate and may be formed to have a thickness corresponding to one substrate.

Although a case where two Peltier elements 21, that is, the Peltier element 21e-1 and the Peltier element 21e-2, are laminated is described as an example here, a configuration in which two or more Peltier elements 21 are laminated can also be adopted.

The Peltier element 21e is configured such that a plurality of Peltier elements 21 are laminated, and thus it is possible to obtain a large temperature amplitude during temperature modulation and to further improve detection accuracy of the light detection device 11e.

For example, a case where the lower side of the Peltier element 21e illustrated in FIG. 6 absorbs heat is assumed. In this case, the substrate 31-1 of the Peltier element 21e-1 absorbs heat, and the substrate 32-1 radiates heat. Since the substrate 31-2 of the Peltier element 21e-2 is in a state of absorbing heat, heat radiated by the substrate 32-1 can be absorbed. Since the substrate 32-2 of the Peltier element 21e-2 is in a state of radiating heat, heat absorbed by the substrate 32-1 of the Peltier element 21e-1 can be radiated from the substrate 32-2 of the Peltier element 21e-2.

In this manner, the Peltier element 21e can more efficiently absorb heat from an object. Similarly, the Peltier element 21e can radiate heat to an object more efficiently. Thus, it is possible to apply a large temperature amplitude to the object during temperature modulation and to improve detection accuracy of the light detection device 11e.

As in the Peltier element 21b in the second embodiment, the Peltier element 21e in the fifth embodiment may be configured such that the P-type semiconductor 33 and the N-type semiconductor 34 are not provided in a region serving as an observation visual field of the light receiving part 25.

As in the Peltier element 21c in the third embodiment, the Peltier element 21e in the fifth embodiment may be configured such that a hole 51 is provided in the substrate 32 corresponding to the region serving as the observation visual field of the light receiving part 25. For example, in the Peltier element 21e illustrated in FIG. 6, a configuration in which the hole 51 is provided in the substrates 32-1, 31-2, and 32-2 can also be adopted.

As in the Peltier element 21d in the fourth embodiment, the Peltier element 21e in the fifth embodiment may be configured such that different materials are used for the substrate 32 corresponding to the region serving as the observation visual field of the light receiving part 25 and the substrate 32 corresponding a region other than the observation visual field.

Sixth Embodiment

Figures 7A, 7B, 7C:
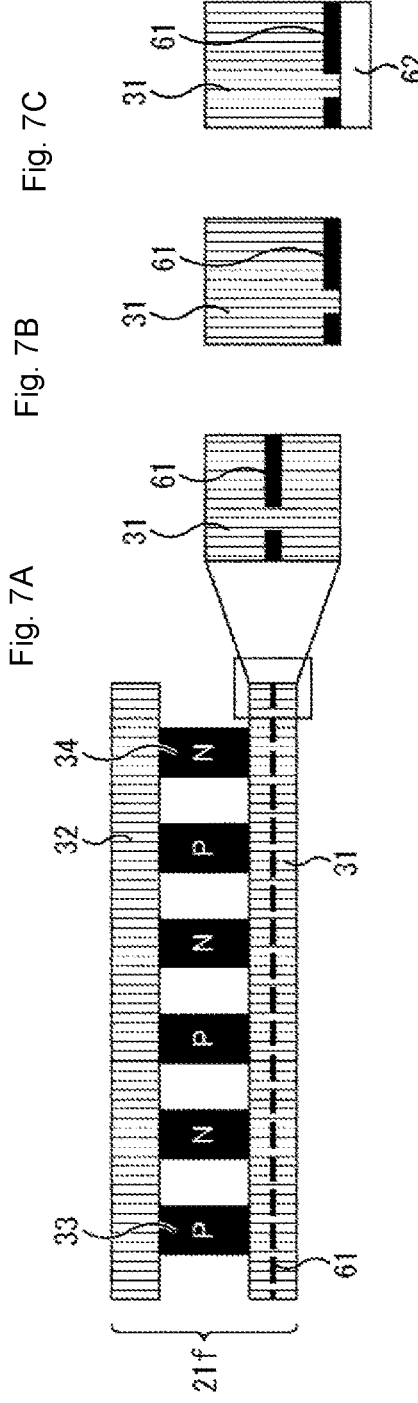
FIGS. 7A, 7B, and 7C are diagrams illustrating another configuration example of a Peltier element.

FIGS. 7A, 7B, and 7C are diagrams illustrating a configuration example of a Peltier element 21f included in a light detection device 11f according to a sixth embodiment.

The Peltier element 21f in the sixth embodiment is the same as the Peltier element 21a in the first embodiment except that a heating element 61 such as a heating wire is added.

The heating element 61 is formed in a substrate 31, which is a substrate closer to an object. As illustrated in FIG. 7A, the heating element 61 is disposed at a position corresponding to the center line of the substrate 31 on the side of an object to be heated. Alternatively, the heating element 61 is disposed on the outermost surface of the substrate 31 at a position corresponding to the side of an object to be heated, as illustrated in FIG. 7B.

When the heating element 61 is disposed on the outermost surface of the substrate 31, and when an object is a living body, it is also possible to adopt a configuration in which a protection film 62 is formed to cover the surface of the heating element 61 on the side of an object to be heated as illustrated in FIG. 7C in order to secure safety. The protection film 62 can be formed by, for example, diamond-like carbon (DLC) coating.

As the material of the heating element 61 (heating wire), metal materials such as steel special use stainless (SUS) and nickel, indium tin oxide (ITO), doped Si (silicon), and the like can be used. The heating element 61 is formed of a material that transmits mid-infrared light (light in a desired wavelength band).

By providing the heating element 61 on the substrate 31, a larger temperature modulation can be applied to an object than when temperature modulation is applied to the object only by the Peltier element 21.

Figure 8:
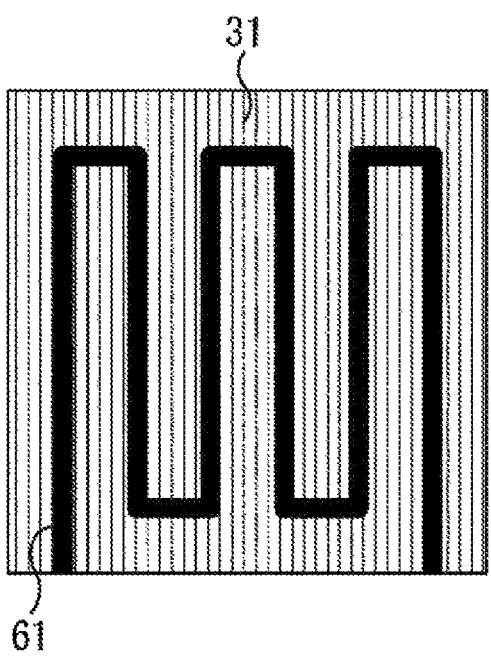
FIG. 8 is a diagram illustrating an arrangement pattern of a heating element.

When the substrate 31 is viewed in a plan view, the heating element 61 is configured in a shape, for example, as illustrated in FIG. 8. The heating element 61 has a meander pattern structure and is formed in the substrate 31 or on the outermost surface of the substrate 31. By forming the heating element 61 in a meander pattern, a portion having the heating element 61 can be heated, and a portion without the heating element 61 can transmit radiant light.

When the heating element 61 is formed in a meander pattern, a material that does not transmit light in a desired wavelength band can also be used as the material of the heating element 61.

The meander pattern is an example and is not a limiting description. The heating elements 61 may be disposed in a pattern other than a meander pattern.

When a material that transmits light in a desired wavelength band is used as the material of the heating element 61, the heating element 61 does not inhibit the incidence of radiant light, and thus, for example, the heating element 61 is formed on the entire outermost surface of the substrate 31, thereby making it possible to efficiently apply heat to an object.

As in the Peltier element 21b in the second embodiment, the Peltier element 21f in the sixth embodiment may be configured such that a P-type semiconductor 33 and an N-type semiconductor 34 are not provided in a region serving as an observation visual field of the light receiving part 25. The heating element 61 may also be disposed to avoid the observation visual field of the light receiving part 25.

As in the Peltier element 21c in the third embodiment, the Peltier element 21f in the sixth embodiment may be configured such that a hole 51 is provided in a substrate 32 corresponding to the region serving as the observation visual field of the light receiving part 25. The heating element 61 may also be disposed to avoid the region of the substrate 31 corresponding to the hole 51.

As in the Peltier element 21d in the fourth embodiment, the Peltier element 21f in the sixth embodiment may be configured such that different materials are used for the substrate 32 corresponding to the region serving as the observation visual field of the light receiving part 25 and the substrate 32 corresponding to a region other than the observation visual field.

As in the Peltier element 21e in the fifth embodiment, the Peltier element 21f in the sixth embodiment may be configured such that a plurality of Peltier elements 21 are laminated.

<Regarding Method of Driving Peltier Element>

A method of driving the Peltier elements 21a to 21f in the first to sixth embodiments will be described with reference to FIGS. 9A and 9B.

Figure 9A:
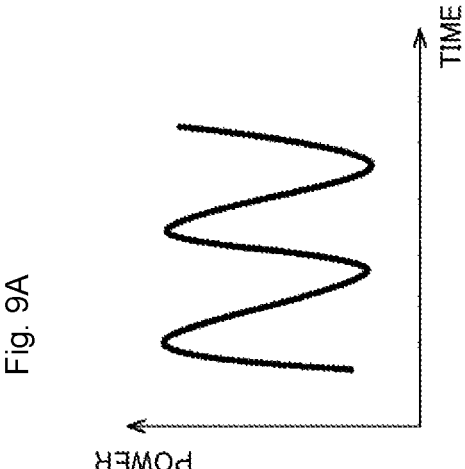
FIGS. 9A and 9B are diagrams illustrating driving of a heating element.

The Peltier element 21 is driven by applying power of a sine wave, as illustrated in FIG. 9A. When the Peltier element 21 is driven with a sine wave, a temperature amplitude corresponding to an amplitude amount of a current or a voltage can be applied to an object.

Figure 9B:
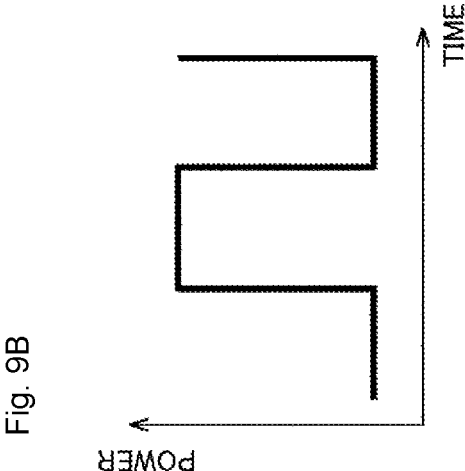

As illustrated in FIG. 9B, the Peltier element 21 can also be configured to be driven with a square wave. Even when the Peltier element 21 is driven with a square wave, it is possible to apply a temperature amplitude corresponding to an amplitude amount of a current or a voltage to an object.

<Regarding Method of Driving Peltier Element and Heating Element>

Figure 10:
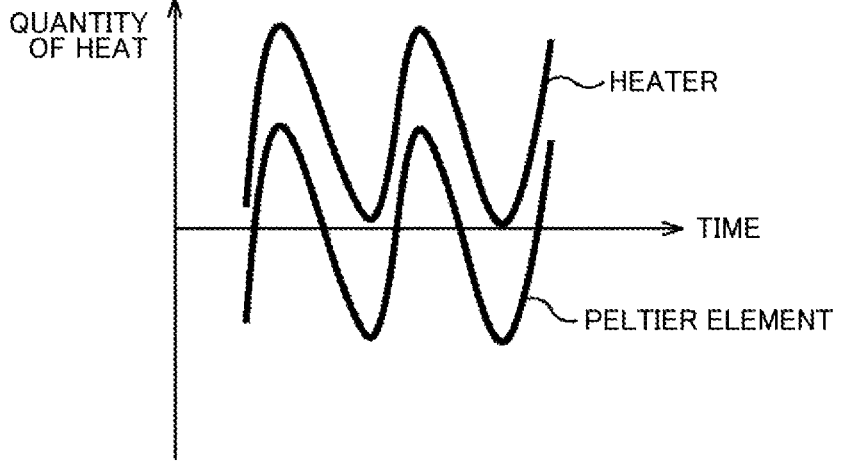
FIG. 10 is a diagram illustrating driving of a heating element and a Peltier element.
Figure 11:
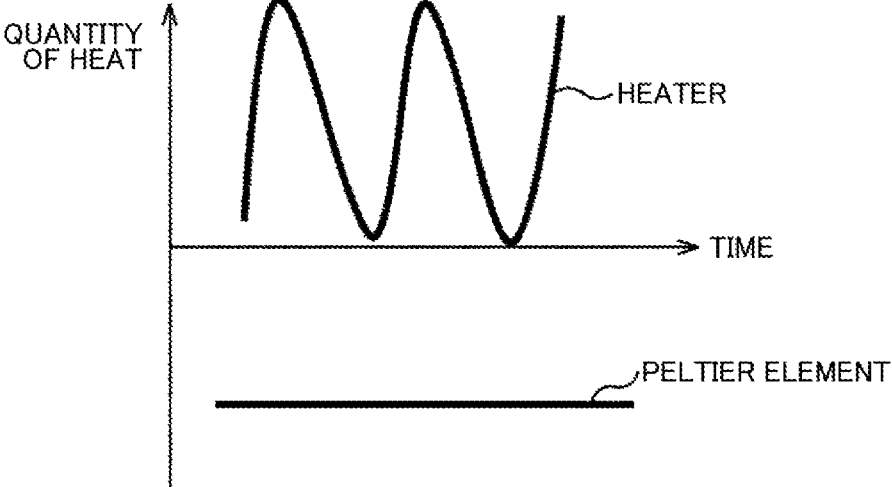
FIG. 11 is a diagram illustrating driving of a heating element and a Peltier element.

As in the Peltier element 21f (FIGS. 7A, 7B, and 7C) in the sixth embodiment, a method of driving the Peltier element 21f including the heating element 61 will be described with reference to FIGS. 10 and 11. FIGS. 10 and 11 are graphs in which a horizontal axis represents a time and a vertical axis represents the quantity of heat, and are graphs showing the quantity of heat generated by the Peltier element 21f and the quantity of heat generated by the heating element 61 over time.

As illustrated in FIG. 10, the Peltier element 21f and the heating element 61 are driven synchronously. For example, as described with reference to FIG. 9A, when the Peltier element 21f is configured to be driven with a sine wave, the heating element 61 is also driven with a sine wave.

When the heating element 61 applies heat to an object, the Peltier element 21f is also set to be in a state of applying heat (radiating heat), and when the heating element 61 does not apply heat to the object, the Peltier element 21f is also set to be in a state of not applying heat (absorbing heat). As a result of such driving, changes in the quantity of heat generated by the Peltier element 21f and the heating element 61 is as illustrated in FIG. 10.

In this manner, it is possible to obtain a large temperature amplitude by synchronously driving the Peltier element 21f and the heating element 61. With the same temperature amplitude, power consumption can also be reduced.

As illustrated in FIG. 11, it is also possible to adopt a configuration in which the Peltier element 21f maintains a heat radiation state and the heating element 61 is driven with a sine wave. Since the Peltier element 21f is maintained in a heat radiation state, the quantity of heat is maintained in a negative state. On the other hand, since the heating element 61 is driven with a sine wave, the quantity of heat changes over time. Even in such a driving method, a large temperature amplitude can be obtained.

Seventh Embodiment

Figure 12:
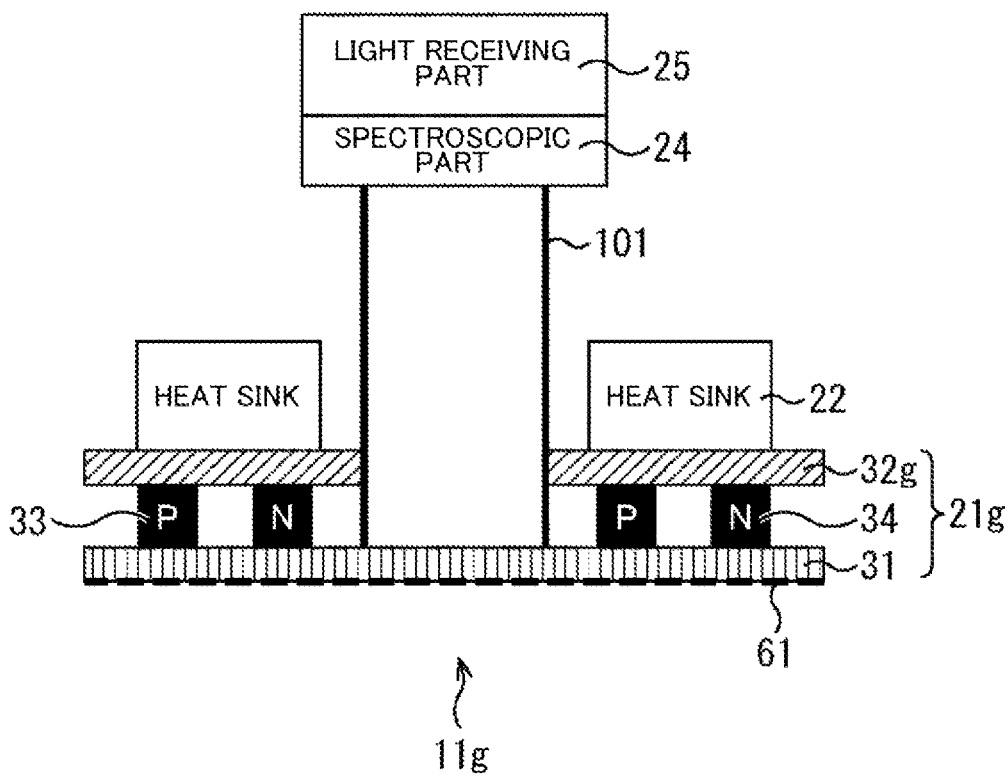
FIG. 12 is a diagram illustrating another configuration example of the light detection device.

FIG. 12 is a diagram illustrating a configuration of a light detection device 11g according to a seventh embodiment.

The light detection device 11g according to the seventh embodiment is configured such that a Peltier element 21g to a light receiving part 25 are integrated. An optical waveguide 101 is provided between a substrate 31 on the lower side of the Peltier element 21g and a light receiving part 25. As in the Peltier element 21c (FIG. 4) in the third embodiment, the Peltier element 21g has a shape in which a hole 51 is provided in a portion corresponding to an observation visual field of the light receiving part 25 and is configured such that the optical waveguide 101 is accommodated in the hole 51.

A substrate 32g may be formed of a material with high thermal conductivity to enhance a heat radiation effect.

A spectroscopic part 24 includes, for example, a bandpass filter, a Fabry-Perot interferometer, a differential spectrometer, a Fourier transform infrared spectrophotometer, and the like, and is configured to spectrally diffract (extract) light in a predetermined band.

With such a configuration, light emitted from an object can be guided to and received by the light receiving part 25 without leakage.

The light detection device 11g illustrated in FIG. 12 shows an example in which a heating element 61 is provided on a substrate 31 in the same manner as the Peltier element 21f (FIGS. 7A, 7B, and 7C) in the sixth embodiment. The seventh embodiment can also be combined with the first to fifth embodiments other than the sixth embodiment.

Eighth Embodiment

Figure 13:
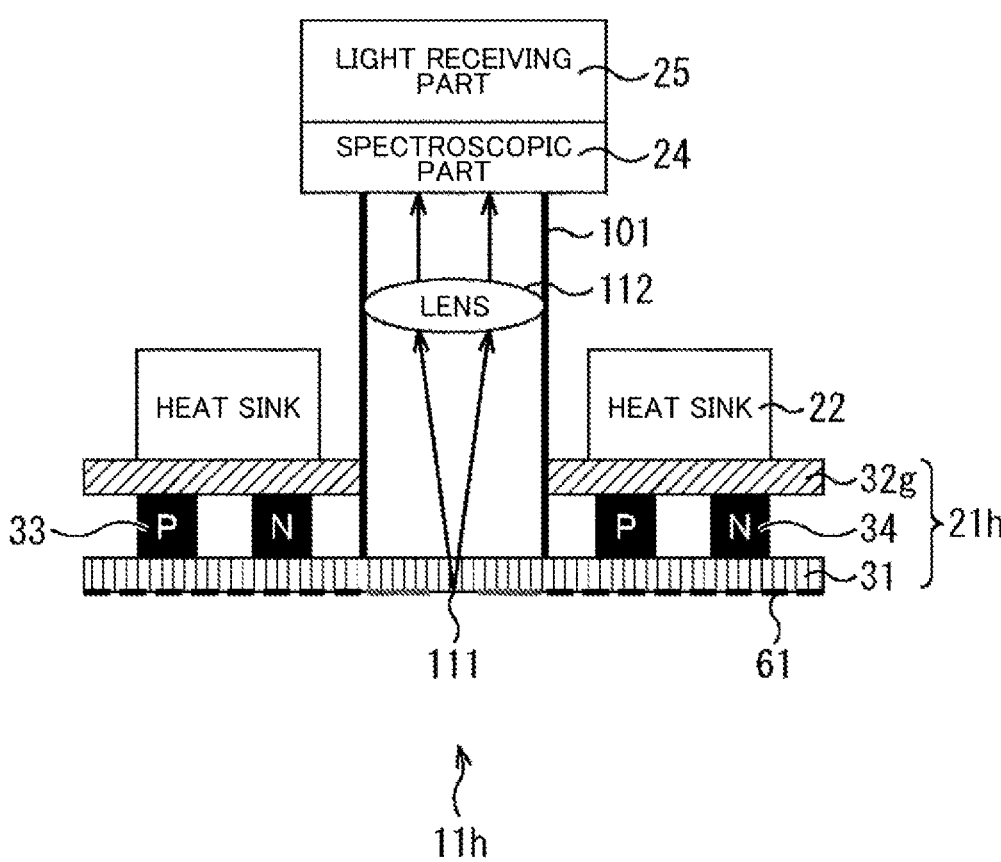
FIG. 13 is a diagram illustrating another configuration example of the light detection device.

FIG. 13 is a diagram illustrating a configuration of a light detection device 11h according to an eighth embodiment.

The light detection device 11h in the eighth embodiment is different from the light detection device 11g (FIG. 12) in the seventh embodiment in that a pinhole 111 and a lens 112 are provided, and is configured similarly in other respects.

The pinhole 111 is provided in a substrate 31 which is a lower substrate of a Peltier element 21h. The pinhole 111 may be formed on the substrate 31, for example, by providing a light shielding film on the substrate 31 and shielding a portion other than the pinhole 111 from light by the light shielding film.

In the case of a configuration including a heating element 61, the heating element 61 is formed of a material that does not transmit light, and such a heating element 61 is provided on the entire surface of the substrate 31 to form a light-impermeable region on the substrate 31. A configuration in which a hole is provided in the heating element 61 only at a portion where the pinhole 111 is formed and the hole serves as the pinhole 111 may also be adopted.

The lens 112 is provided in an optical waveguide 101. In the light detection device 11h according to the eighth embodiment, light which is input through the pinhole 111 spreads in the optical waveguide 101, is incident on the lens 112, is converted into parallel light by the lens 112, and is incident on a spectroscopic part 24. Since light is incident on the spectroscopic part 24 (the light receiving part 25 via the spectroscopic part 24) from a normal direction, wavelength resolution can be improved.

The eighth embodiment can also be combined with the first to sixth embodiments.

Ninth Embodiment

Figure 14:
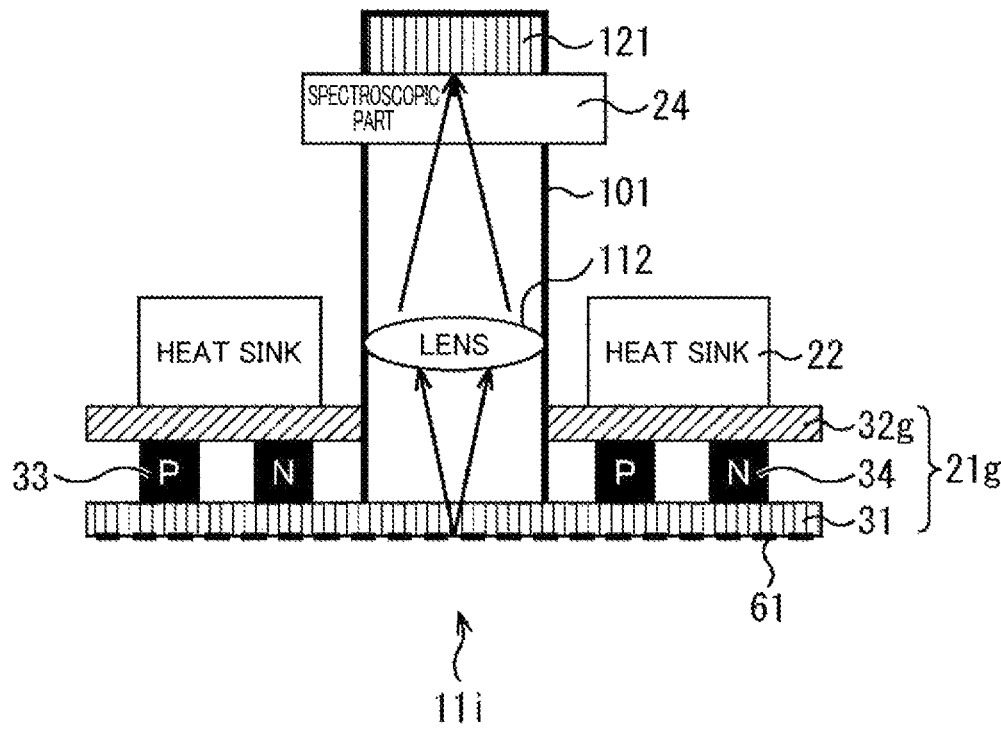
FIG. 14 is a diagram illustrating another configuration example of the light detection device.

FIG. 14 is a diagram illustrating a configuration of a light detection device 11i according to a ninth embodiment.

The light detection device 11i in the ninth embodiment is different from the light detection device 11g (FIG. 12) in the seventh embodiment in that a lens 112 and a light receiving part 121 formed in an array are provided, and is configured similarly in other respects.

The light receiving part 121 is configured such that light receiving elements are disposed in an array. Light from an object is incident on the lens 112 provided in an optical waveguide 101, is condensed, and is incident on a spectroscopic part 24. The light spectrally diffracted by the spectroscopic part 24 is received by the light receiving part 121 in which the light receiving elements are disposed in an array.

By using the light receiving part 121 in which the light receiving elements are disposed in an array, it is possible to measure a concentration distribution of a predetermined material within a measurement area (within an observation visual field).

For example, when there is a portion where the substrate 31 is raised (a portion that is not in contact with an object) within the measurement area, the temperature of the portion cannot be modulated. By using this, it is possible to detect a contact state, and when a portion with a poor contact state is detected, for example, it is possible to give an advice to a user to improve the contact of the object (object to be measured).

The ninth embodiment can also be combined with the first to sixth embodiments.

In the above-described embodiments, an example in which the substrates (the substrate 31 and the substrate 32) and the semiconductors (the P-type semiconductor 33 and the N-type semiconductor 34) are directly laminated has been described, but the substrates and the semiconductors may be separate assemblies. For example, a Peltier element in which an electrode, which is referred to as a skeleton type, and an insulating film are bonded together can also be applied to the present technology. When such a Peltier element is used, the present technology can also be applied to an insulating film or a plate-shaped reinforcing material laminated on the outside.

According to the present technology, it is possible to detect radiant light emitted from an object to be measured while directly applying temperature to the object.

In the present specification, a system refers to an entire device constituted by a plurality of devices.

The effects described in the present specification are merely examples and are not limited, and other effects may be obtained.

Embodiments of the present technology are not limited to the above-described embodiments and various modifications can be made within the scope of the present technology without departing from the gist of the present technology.

The present technology can also be configured as follows.

(1)
  A light detection device including:
  a Peltier element configured of a P-type semiconductor and an N-type semiconductor disposed between a first substrate and a second substrate; and
  a light receiving part configured to receive light from an object having been subjected to temperature modulation by the Peltier element,
  wherein the first substrate is provided on the object side,
  the second substrate is provided on the light receiving part side, and at least parts of the first substrate and the second substrate are configured to transmit light from the object.

(2)
  The light detection device according to (1),
  wherein the light from the object is infrared light.

(3)
  The light detection device according to (2),
  wherein the first substrate and the second substrate are formed of a material that transmits the infrared light.

(4)
  The light detection device according to (1) or (2),
  wherein a region of the second substrate which falls within an observation visual field of the light receiving part is a hole.

(5)
  The light detection device according to (4),
  wherein the second substrate is formed of a material with high thermal conductivity.

(6)
  The light detection device according to any one of (1) to (5),
  wherein a first region of the second substrate which falls within an observation visual field of the light receiving part and a second region of the second substrate which falls outside the first region are formed of materials having different transmittances with respect to the light from the object.

(7)
  The light detection device according to any one of (1) to (6),
  wherein the P-type semiconductor and the N-type semiconductor are not disposed in a region falling within an observation visual field of the light receiving part.

(8)
  The light detection device according to any one of (1) to (7),
  wherein the Peltier element is configured of a plurality of laminated Peltier elements.

(9)
  The light detection device according to any one of (1) to (8),
  wherein the first substrate and the second substrate are formed of a material that transmits light with a wavelength of 5 μm or more.

(10)
  The light detection device according to (1),
  wherein a heating element is disposed on the first substrate.

(11)
  The light detection device according to (10),
  wherein the heating element is disposed to have a meander pattern structure on the first substrate.

(12)
  The light detection device according to (10) or (11),
  wherein the heating element is disposed in the first substrate or on an outermost surface of the first substrate on the object side.

(13)
  The light detection device according to any one of (10) to (12),
  wherein modulation driving of the Peltier element and modulation driving of the heating element are synchronized with each other.

(14)
  The light detection device according to any one of (10) to (12),
  wherein the Peltier element is driven to absorb heat with respect to the object, and the heating element performs modulation driving.

(15)
  The light detection device according to any one of (1) to (14),
  wherein an optical waveguide is disposed between the first substrate and the light receiving part.

(16)

The light detection device according to (15), wherein a pinhole is formed in the first substrate, and a lens is disposed in the optical waveguide.

(17)

The light detection device according to (15) or (16), wherein a lens is disposed in the optical waveguide, and the light receiving part is configured of light receiving elements disposed in an array.

(18)

The light detection device according to any one of (1) to (17), further including:

a spectroscopic part configured to spectrally diffract predetermined light among light from the object, the spectroscopic part being provided between the Peltier element and the light receiving part.

REFERENCE SIGNS LIST

11 Light detection device
21 Peltier element
22 Heat sink
23 Case
24 Spectroscopic part
25 Light receiving part
31 Substrate
32 Substrate
33 P-type semiconductor
34 N-type semiconductor
51 Hole
61 Heating element
62 Protection film
101 Optical waveguide
111 Pinhole
112 Lens
121 Light receiving part

The invention claimed is:

1. A light detection device, comprising:

a Peltier element comprising:

a P-type semiconductor;
an N-type semiconductor;
a first substrate; and
a second substrate, wherein
each of the P-type semiconductor and the N-type semiconductor is between the first substrate and the second substrate, and
the Peltier element is configured to subject an object to temperature modulation; and a light receiving part configured to receive first light from the object subjected to the temperature modulation by the Peltier element, wherein the first substrate is on an object side of the light detection device,
the second substrate is on a light receiving part side of the light detection device,
a region of the second substrate is within an observation visual field of the light receiving part,
the region of the second substrate is a hole, and
each of a first part of the first substrate and a second part of the second substrate is configured to transmit the first light from the object towards the light receiving part.

2. The light detection device according to claim 1, wherein the first light from the object is infrared light.

3. The light detection device according to claim 2, wherein each of the first substrate and the second substrate comprises a material, and
the material transmits the infrared light.

4. The light detection device according to claim 1, wherein the second substrate comprises a material having thermal conductivity.

5. The light detection device according to claim 1, wherein the P-type semiconductor and the N-type semiconductor are outside the region of the second substrate.

6. The light detection device according to claim 1, wherein the Peltier element further comprises a plurality of laminated Peltier elements.

7. The light detection device according to claim 1, wherein each of the first substrate and the second substrate comprises a material,
the material transmits the first light, and
a wavelength of the transmitted first light is equal to or greater than 5 μm.

8. The light detection device according to claim 1, further comprising a heating element on the first substrate.

9. The light detection device according to claim 8, wherein a structure of the heating element is a meander pattern structure.

10. The light detection device according to claim 8, wherein the heating element is one of in the first substrate or on an outermost surface of the first substrate.

11. The light detection device according to claim 8, wherein a modulation driving process of the Peltier element is in synchronization with a modulation driving process of the heating element.

12. The light detection device according to claim 8, wherein the Peltier element is configured to absorb heat,
the absorbed heat is associated with the object, and
the heating element is configured to perform a modulation driving process.

13. The light detection device according to claim 1, further comprising an optical waveguide between the first substrate and the light receiving part.

14. The light detection device according to claim 13, further comprising:

a pinhole in the first substrate; and
a lens in the optical waveguide.

15. The light detection device according to claim 13, further comprising:

a lens in the optical waveguide, wherein the light receiving part comprises a plurality of light receiving elements in an array.

16. The light detection device according to claim 1, further comprising:

a spectroscopic part configured to spectrally diffract a specific wavelength band of second light from the object, wherein the second light is associated with the first light, and
the spectroscopic part is between the Peltier element and the light receiving part.

* * * * *